June 29, 1965  E. C. HOPKINSON  3,192,386
PULSE TRANSMISSION OVER A LONG CABLE IN THE
PRESENCE OF A LOW FREQUENCY POWER
Original Filed Feb. 26, 1960
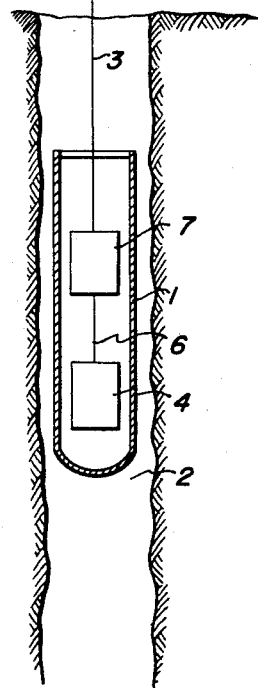
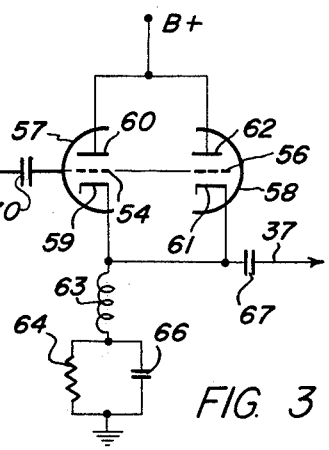
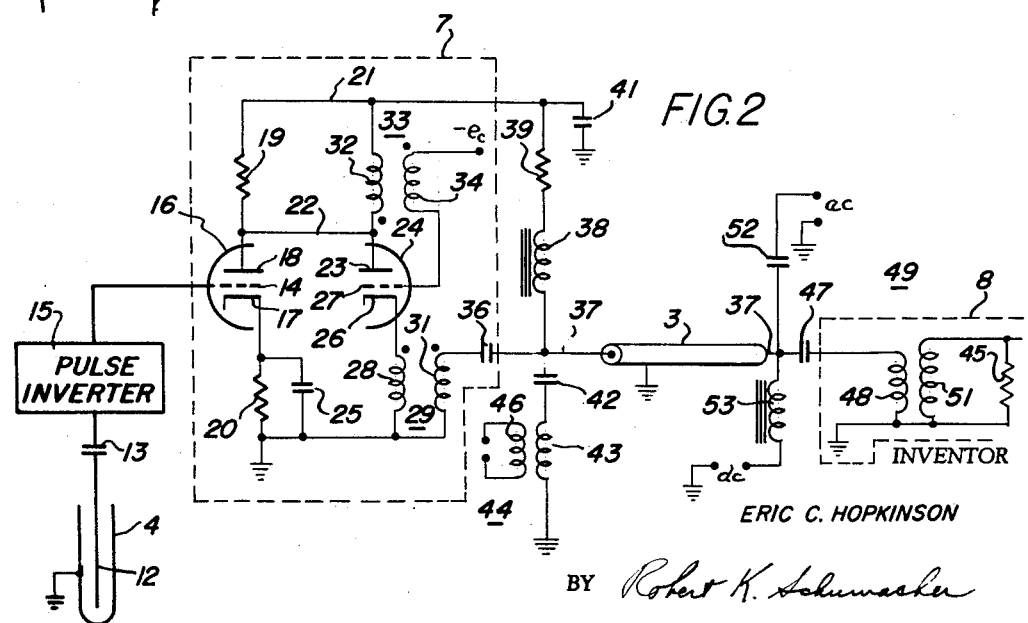
INVENTOR
ERIC C. HOPKINSON
BY Robert K. Schumacher
ATTORNEY United States Patent Office 3,192,386
Patented June 29, 1965

3,192,386
PULSE TRANSMISSION OVER A LONG CABLE IN THE PRESENCE OF A LOW FREQUENCY POWER
Eric C. Hopkinson, Houston, Tex., assignor, by mesne assignments, to Dresser Industries, Inc., Dallas, Tex., a corporation of Delaware
Continuation of application Ser. No. 11,219, Feb. 26, 1960. This application Feb. 27, 1963, Ser. No. 261,951
2 Claims. (Cl. 250—83.3)

This is a continuation of co-pending application for Letters Patent by Eric C. Hopkinson for Pulse Transmission Over a Long Cable in the Presence of a Low Frequency Power, having Serial Number 11,219, filed February 26, 1960, now abandoned.

Although the present invention is of broad general applicability in the field of pulse transmission, it is of particular interest in the field of well logging or surveying and therefore the circuits of the invention are described as applied to the well logging field. In the field of well logging, information is often transmitted from a well surveying tool to a surface station by means of pulses of electrical energy applied to a well logging cable interconnecting the surface and subsurface equipment. The pulses to be transmitted may be derived from an analog to pulse-code modulator so that the pulses represent analog information or may be derived from a radiation detector in which case the number of pulses occurring per given interval of time may represent the rate of radiation from subsurface strata under investigation and the amplitude of the pulses may represent the energy of such radiation. Regardless of the source of pulses to be transmitted from the subsurface equipment to the surface equipment, difficulties arise due to the characteristics of the cable extending therebetween. More specifically, the series and shunt impedances of the line produce serious attenuation of the amplitude of the pulses transmitted, making their detection at the surface difficult and unreliable and further limiting the high frequency characteristics of the cable. The long time constants of the line, which are primarily due to the series resistance and shunt capacity of the cable, restrict the rise and decay times of pulses. In systems of the type under consideration, pulses often generate damped oscillations in the cable and if the cable has a long time constant, the decay time of the damped oscillations is quite long. As a result, if it is attempted to apply pulses to such a cable at too high a rate, and such high pulse rates are often encountered in radiation surveying equipment, a pulse may be applied to the cable during the decay time of a preceding pulse and may not be detected at the surface station as a distinct unit of information. Obviously, such a loss of pulses results in an inaccurate well log.

Another difficulty which arises in systems of this type is that A.C. power is often required at the well logging tool for operating electric motors and other A.C. operated equipment, and difficulty may arise as a result of the alternating current signals influencing the pulse generator at the subsurface station and the pulse detecting system or receiver at the receiving end of the station. More specifically, if the cable is also supplying A.C. power to other apparatus in the well logging tool then the amplitude of this A.C. voltage must be reduced at both the pulse transmitter and pulse receiver so that it does not influence the operation of the pulse transmitter and also is not detected by the pulse receiver.

In accordance with the present invention, there is provided a pulse transmission circuit for producing pulses at the receiving end of the cable having amplitudes large enough to permit ready detection, and for minimizing the resolving time of pulses on the conductor, which circuit also prevents the A.C. power frequency applied to the circuit from interfering with the pulse transmitter and receiver. The approximate equation for the time constant, T, of a cable having series resistance and shunt capacity, C, is:

$$T \cong \frac{R_L(R_g+R_c)}{R_L+R_g+R_c} C$$

where $R_L$ is the load resistance, $R_g$ is the transmitter output resistance and $R_c$ is the series resistance of the cable.

Since the values of $R_c$ and C are fixed, in order to improve the pulse resolution of the cable, it is necessary to reduce the values of $R_L$ and $R_g$. The resistance of the generator, that is, the pulse transmitter, may be maintained small by driving the cable from a cathode follower circuit while the impedance of the load may be maintained small by employing a low impedance element at the receiving end of the cable. As a result of employing a low impedance generator and a low impedance receiver, the time constant of the cable is quite short so that the rise time of the pulses and decay time of the damped oscillations and therefore, of the pulses, is small and, in consequence, pulses occurring at a relatively high rate may be transmitted over the cable without interference between successive pulses.

As previously indicated, some difficulty is encountered in circuits of this nature where alternating current power frequencies must be applied to the cable, since normally these power line frequencies interfere with the proper operation of the transmitting and receiving equipment.

A further feature of the present invention relates to the utilization of the low impedance input and load elements each as an element in a distinct low frequency rejection filter. One such rejection filter may be formed by coupling the signals developed across the cathode impedance of the pulse transmitter to the cable through a capacitor which has a low impedance at the pulse frequencies but a high impedance at the A.C. power frequency. Therefore, the voltage on the cable is divided across the capacitor and the cathode load impedance and since the capacitor has a high impedance at the power frequencies and the cathode impedance has a low impedance thereto, very little of the A.C. power is developed across the cathode impedance. The same arrangement is employed at the receiving end; that is, the cable is connected through a capacitor, having a high impedance to power frequencies, to an inductive element having a low impedance to power frequencies. Consequently, the amplitude of the A.C. power developed across the inductor is of such a small value, relative to the amplitude of the information pulses, that the power frequency signals may be easily descriminated against by the pulse receiver.

Although the utilization of an inductive load, having a low D.C. resistance and a low impedance at power frequencies, increases the pulse resolution time of the cable and permits isolation of the signal and power circuits, the amplitudes of the pulses available at the receiving end of such a system are still quite small and difficult to detect. The A.C. cable and load impedances are connected in series and constitute a voltage divider circuit. As an example, the cable may have a resistance of six ohms per thousand feet which is not uncommon for well logging cables, and the D.C. resistance of the load impedance may be of the order of magnitude of five to ten ohms. The A.C. impedance of the load is naturally larger than the D.C. resistance but is still small compared to the total resistance of the cable. Under these circumstances, the pulse voltage across the load impedance may be quite small when logging with cables of from 10,000 to 15,000 feet in length which are often encountered in practice. In accordance with another feature of the present invention, voltage amplification is achieved by employing a step-up transformer in place of the inductive load. Such a transformer permits voltage amplification while maintaining a suitably low D.C. termination impedance and therefore does not affect the pulse resolution time. For example, if logging is taking place over 15,000 feet of conventional well logging cable, the input voltage pulses are nominally of an amplitude of 30 volts, and the step-up ratio of the transformer is 5:1; pulses of one-half volt are developed across the cable load. The input impedance of the step-up transformer is quite low at power frequencies as well as at D.C. Therefore, if a capacitor having a high impedance at power frequencies is inserted between the cable and the primary winding of the transformer, a rejection filter is provided with the transformer forming one of its elements.

In the circuit of the present invention, therefore, three basic problems relating to the transmission of pulses over long cables are ameliorated, these problems relating to resolution time of the cable, attenuation of the pulses by the cable and the interference with the transmission and receiving equipment by A.C. power applied to the cable.

In accordance with a first specific embodiment of the present invention, the pulse transmitter comprises an externally driven blocking oscillator having an inductive load in the cathode circuit. The blocking oscillator may be fed by a positive pulse from a radiation detector such as a Geiger-Muller tube after pulse inversion, and the oscillator circuit produces a single pulse for each pulse produced by the tube. The blocking oscillator circuit provides a particularly low impedance source for the transmission circuit and further provides high amplitude pulses which render detection of the pulses at the receiving end and their resolution with respect to A.C. power signals extremely simple.

A difficulty with the blocking oscillator is that it is not possible to preserve pulse amplitude information. Therefore, in accordance with a second embodiment of the present invention, where a radiation detector is employed which is capable of producing a spectrum of pulse amplitudes, a power amplifier is employed to drive the cable that includes a cathode follower having an inductive load in the cathode circuit. In either of the circuits of the present invention, a pulse transformer having a one-to-one ratio may be employed in the cathode circuit of the pulse transmitter to reverse the polarity of the pulses if so desired.

It is therefore a primary object of the present invention to provide a circuit for transmitting pulses over a cable, the circuit having means for generating pulses at a receiving end of the cable having readily detectable amplitudes, and for improving the resolving time of pulses on the cable, which means also constitute high impedance A.C. rejection filters for power frequencies at both ends of the cable.

It is another object of the present invention to provide a pulse transmission circuit which compensates for the reduction of pulse amplitudes due to attenuation by the cable and which provides a decay time for damped oscillations generated in the cable so as to permit high resolution of pulses on the cable.

It is another object of the present invention to provide a pulse transmission circuit in which the input and output impedances to a cable interconnecting a pulse transmitter and receiver are maintained quite low so as to reduce the time constant of the circuit and thereby permit short resolving time of pulses on the cable.

It is another object of the present invention to provide a pulse transmission circuit having low impedance input and termination impedances which reduce the time constant of the pulse transmission circuit and which have a low impedance at power line frequencies.

The above and still further objects, features and advantages of the present invention will become apparent upon consideration of the following detailed description of two specific embodiments thereof, especially when taken in conjunction with the accompanying drawings, wherein:

FIGURE 1 is a vertical elevation through a borehole illustrating a well surveying tool located in the borehole and electronic equipment which may be employed at the surface of the borehole;

FIGURE 2 is a schematic wiring diagram of a first embodiment of the present invention; and FIGURE 3 is a schematic wiring diagram of the transmitter employed in a second embodiment of the present invention.

Referring now specifically to FIGURE 1 of the accompanying drawings, a well surveying tool 1 is suspended in a borehole 2 on the end of a cable 3 which is adapted to withdraw the tool 1 through the well bore 2 for the purposes of measuring various characteristics of the subsurface formations surrounding the well. The well tool 1 may be provided with a radiation detector 4, which is adapted to supply pulses, resulting from the impingement of radiations, such as, gamma rays or neutrons, over a lead 6 to a pulse transmitter 7 constituting one element of the circuitry of the present invention. The output circuit of the pulse transmitter 7 is connected to the well logging cable 3 which is connected at the surface of the well to a pulse amplifier 8. The output signals or pulses developed by the pulse amplifier 8 are applied to a pulse detection circuit 9 which may constitute a pulse rate counter or pulse height analyzer. The output signals detected by the circuit 9 may be applied to a recording instrument 11 or other suitable signal indicator.

As the well tool 1 is withdrawn from the well bore 2, the radiation impinging upon the detector 4 which may result from natural or induced radiation, is an indication of various characteristics of the subsurface strata surrounding the well in the region of the well tool, and these pulses are transmitted to the surface equipment as an indication of specific parameters being measured.

As previously indicated, when it is attempted to transmit pulses over the cable 3, certain difficulties are encountered as a result of the attenuation of the pulses due to the series impedance of the cable, the pulse resolution time of the cable due to its series resistance and shunt capacity, and the necessity for separating alternating current A.C. power frequencies from the pulse circuits.

Referring now specifically to FIGURE 2 of the accompanying drawing which is a schematic wiring diagram of a first embodiment of the present invention, those elements which are common to FIGURES 1 and 2 bear the same reference numerals. A center electrode 12 of the Geiger-Muller tube 4 is connected via a coupling capacitor 13 to a pulse inverter 15 the output of which is a positive pulse applied to a grid 14 of a triode amplifier 16 having cathode 17 and an anode 18. The cathode 17 is connected to a source of reference potential, which for the purposes of description is designated as ground, via a bias resistor 20 which is shunted by a by-pass capacitor 25. The anode 18 of the tube 16 is coupled via a load resistor 19 to a D.C. high voltage lead 21 and via a lead 22 to an anode 23 of a triode 24 employed in an externally triggered blocking oscillator circuit. The tube 24 further comprises a cathode 26 and grid 27, with the cathode 26 being coupled to ground via a primary winding 28 of a pulse transformer 29. The pulse transformer 29 further comprises a secondary winding 31 and the windings 28 and 31 are connected for purposes of example only, so as to produce the same pulses across the primary and secondary windings. The anode 23 is coupled via a primary winding 32 of a pulse transformer 33 to the lead 21 and a secondary winding 34 of the transformer 33 has one end connected to grid 27 of the triode 24 and has its other end connected to a source of grid bias potential.

In the operation of the circuit thus far described, a negative pulse appears at the anode 18 of the tube 16 in response to each pulse produced by the tube 4 and applied to grid 14 via inverter 15. This pulse is coupled via the lead 22 to the anode 23 of the triode 24. The pulse appearing at the anode 23 of the triode 24 is reversed in polarity and applied to the grid 27 of the tube 24 via the secondary winding 34 of the pulse transformer 33. The positive pulse on the grid 27 triggers the blocking oscillator and causes a sharp, high amplitude pulse to be developed across the primary winding 28 of the pulse transformer 29 in the cathode circuit of the tube. Upon the tube 24 reaching saturation, the feedback voltage to the grid 27, via the winding 34 of the transformer 33, terminates and the current flow through the tube is rapidly discontinued.

Proceeding with the description of the circuit, the ungrounded end of the secondary winding 31 of the pulse transformer 29 is coupled via a capacitor 36 to a center conductor 37 of the well logging cable 3. The center conductor 37 of the cable 3 is also connected via a choke 38 and a resistor 39 to the lead 21, the lead 21 also being connected to ground through a decoupling capacitor 41. The choke 38 serves to permit D.C. on lead 37 to be applied to lead 21 while preventing the A.C. currents on the center conductor 37 from being applied to the lead 21. The resistor 39 is employed in conjunction with the capacitor 41 as a further decoupling circuit for by-passing the residual A.C. to ground. The center conductor 37 is further connected through a D.C. blocking capacitor 42 to one end of a primary winding 43 of a transformer 44. The other end of the primary winding 43 is connected to ground, and the transformer 44 further comprises a secondary winding 46 across which is developed A.C. power for application to circuits requiring A.C. power for operation.

The secondary winding 31 of the transformer 29 is a low impedance winding, and therefore, serves to maintain the source resistance at a low value so as to reduce the time constant of the circuit interconnecting the pulse transmitter 7 and the pulse receiver or amplifier 8. Further, the capacitor 36 has a relatively high impedance to the low frequency power currents while the relatively low impedance winding 31 has a low impedance to these low power frequencies. Therefore, a very large portion of the A.C. voltage appearing on the center conductor 37 of the cable 31 is developed across the capacitor 36 and only a very small portion of this signal is developed across the secondary winding 31. The amount of voltage developed across the winding 31 is insufficient to materially affect the operation of the blocking oscillator circuit 24 and therefore, the capacitor 36 and winding 31 constitute a high impedance A.C. rejection filter for power frequency signals while also producing a low impedance input circuit to the cable which helps to reduce the time constant thereof.

At the surface station or the receiving end of the pulse transmission circuit, the center conductor 37 of the cable 3 is connected via a capacitor 47 to an input or primary winding 48 of a step-up transformer 49 further comprising a secondary winding 51. The primary winding 48 is a relatively low impedance winding which serves several functions in the circuit of the invention. Specifically, since the primary winding 48 is a low impedance winding it minimizes the time constant of the transmission circuit thereby improving the pulse resolution properties thereof. Further, the winding 48 has a low impedance to power line frequencies while the capacitor 47 has a high impedance to such frequencies and therefore, the capacitor 47 and winding 48 constitute a high impedance A.C. rejection filter for the power line frequencies. In consequence, the receiving apparatus 8 is readily able to discriminate between the pulses transmitted over the power line 3 and the power frequency signals applied thereto.

In accordance with another aspect of the present invention, the transformer 49 is a step-up transformer which increases the amplitude of the pulses applied to the active elements of the amplifier 8 to a magnitude which is readily detectable. A load 45 is connected across the secondary winding of the transformer, and must be of such a value relative to the turns ratio of the transformer that the requisite low impedance is reflected into the primary winding circuit. Qualitatively the reflected load impedance should be of the same order of magnitude as the impedance per thousand feet of the cable.

At the receiving end, alternating power current is applied to the center conductor 37 of the cable 3 via a D.C. blocking capacitor 52 while direct current is applied to the center conductor 37 via an A.C. choke 53 which prevents A.C. signals or pulses from being shunted to ground through the D.C. supply.

As previously indicated, the circuit of FIGURE 2 does not permit the transmission of pulse amplitude information to the surface since the amplitude of the pulse produced by the blocking oscillator circuit is independent of the amplitude of the pulse applied thereto so long as the amplitude of the pulse is sufficient to trigger the blocking oscillator. If it is desirable to preserve the pulse amplitude information transmitted to the surface, the circuit of FIGURE 3 may be employed. Referring specifically to this circuit, the Geiger-Muller tube 4 of FIGURE 2 is replaced by a detector 50 capable of producing a spectrum of amplitudes. The output pulses produced by detector 50 are applied to an amplifier 55 and thence through coupling capacitor 70 to two grids 54 and 56 of power triodes 57 and 58 respectively, which may constitute the two halves of a single vacuum tube. The tube 57 further comprises an anode 60 which is directly coupled to a source of anode voltage and a cathode 59 which is connected to a cathode 61 of the triode 58. The triode 58 further includes an anode 62 connected to the anode 58 of the tube 57 and therefore the tubes 57 and 58 are connected in parallel. The cathodes 59 and 61 of the tubes 57 and 58 are connected via a low impedance inductor 63 to one end of a bias resistor 64, the other end of which is connected to ground. The resistor 64 is shunted by a bypass capacitor 66, the resistor 64 and capacitor 66 constituting a bias circuit for the triodes 57 and 58. The cathodes 59 and 61 are further connected through a capacitor 67 to the center conductor 37 of the cable 3. The low impedance inductor 63 serves the same purpose in this circuit as the secondary winding 31 of the transformer 29 in FIGURE 2 in that it provides a low impedance output circuit for the pulse transmission apparatus and therefore permits the development of a pulse transmission circuit having a low time constant. The value of the capacitor 66 is sufficiently large that it does not materially affect the operation of the circuit in this respect. The capacitor 67 has a high impedance with respect to power line frequencies while the inductor 63 has a low impedance with respect thereto and therefore the inductor 63 and capacitor 67 constitute a high impedance rejection filter for alternating current power frequencies which may be applied to the cable. In all respects, the circuit of FIGURE 3 operates substantially the same as the circuits of FIGURE 2 except that the amplitude of the pulses developed by the circuit are proportional to the amplitude of the signals developed by the source of the pulses 50, and therefore, the pulse amplitude information is preserved. In the circuit of FIGURE 3 a one-to-one ratio pulse transformer may be substituted for the inductor 63 so as to produce pulse inversion if so desired.

While I have described and illustrated two specific embodiments of my invention, it will be clear that variations of the details of construction which are specifically illustrated and described may be resorted to without departing from the true spirit and scope of the invention as defined in the appended claims.

What I claim is:
1. A well logging apparatus comprising a radiation detector for producing voltage pulses in response to radioactivity emanations,
  a pulse transmitter for producing pulses in response to voltage pulses produced by said radiation detector,
  said pulse transmitter having a low impedance output circuit, comprising an inductor and capacitor connected in series,
  a pulse receiver having a low impedance input circuit, comprising a capacitor and inductor in series,
  a cable interconnecting said circuits,
  the inductor and capacitor of said input and output circuits connected in series with said cable,
  said inductors having a low impedance to power frequency signals and said capacitors having a high A.C. impedance at power frequency signals.

2. A pulse transmission circuit for well logging apparatus suitable for use with a logging cable on which both A.C. and D.C. power are present, said circuit comprising,
  a pulse transmitter having a low output impedance comprising a pulse transformer provided with a secondary winding having inductance offering a low impedance to power line frequencies and a capacitor having a high impedance to power line frequencies in series with the secondary winding,
  a pulse receiver having a low input impedance comprising a pulse transformer provided with a primary winding having an inductance offering a low impedance to power line frequencies and a capacitor having a high impedance to power line frequencies in series with the primary winding,
  a cable interconnecting said pulse transmitter and said pulse receiver, the capacitors of said pulse transmitter and said pulse receiver being in series with said cable.

References Cited by the Examiner

UNITED STATES PATENTS

| | | | |
|---|---|---|---|
| 2,321,295 | 6/43 | Howell | 250—83.6 |
| 2,501,953 | 3/53 | Martin | 340—18 |
| 2,824,238 | 2/58 | Stillmacher | 250—83.6 |
| 2,909,663 | 10/59 | McFarlane | 250—83.6 |
| 2,911,536 | 11/59 | Scherbatskoy | 250—83.6 |

RALPH G. NILSON, *Primary Examiner.*